United States Patent [19]

Pauwels et al.

[11] Patent Number: 5,600,642

[45] Date of Patent: Feb. 4, 1997

[54] METHOD FOR MODIFYING A MULTICAST TREE IN A SWITCHING NETWORK

[75] Inventors: Ludwig Pauwels, Hoboken; Filip Callens, Hoegaarden; Pascal Lefebvre, Woluwe-St-Pierre, all of Belgium

[73] Assignee: Alcatel N.V., BH Risjwijk, Netherlands

[21] Appl. No.: 527,488

[22] Filed: Sep. 13, 1995

[30] Foreign Application Priority Data

Sep. 13, 1994 [EP] European Pat. Off. .............. 94202633

[51] Int. Cl.$^6$ .............................................. H04L 12/56
[52] U.S. Cl. .............................................. 370/396
[58] Field of Search ........................... 370/60, 60.1, 94.1, 370/94.2, 94.3, 61, 58.1, 58.2, 58.3, 54, 59, 63, 64, 65, 65.5, 66, 67, 68; 340/825.03

[56] References Cited

U.S. PATENT DOCUMENTS 5,325,090  6/1994  Goeldner ................................... 370/54

FOREIGN PATENT DOCUMENTS 0575281  12/1993  European Pat. Off. .

OTHER PUBLICATIONS

XIV International Switching Symposium, vol. 2 of 2, 25 Oct. 1992, Yokohama, pp. 156–160, K. J. Schrodi, et al, "Multicast Handling in a Self–Routing Switch" XP 000337713.

"An ATM switching architecture with intrinsic multicast capabilities for the Belgian broadband experiment" De Prycker et al, Proceedings ISS 1990, Stockholm, May 1990, pp. 111–118.

*Primary Examiner*—Douglas W. Olms
*Assistant Examiner*—Dang Ton
*Attorney, Agent, or Firm*— Ware, Fressola, Van Der Sluys & Adolphson

[57] ABSTRACT

In a switching network with a plurality of inlets and outlets and a plurality of interconnected switching nodes having inputs and outputs with respective addresses, a method is described of modifying a first set of outlets to which a cell stream is routed from one of the inlets to a second set of outlets to which this cell stream is to be routed, the addresses of the outputs of each switching node from which the cell stream is output being stored in a routing table of the node. The method includes the steps of transmitting a modification request message to the inlets from each outlet belonging to one but not to both sets and in each switching node receiving the modification request message on one of its outputs, selectively transmitting the request message to the inlets or transmitting a confirmation message to the above each outlet depending on the absence or presence in the node routing table of addresses of node outputs other than the one node output, respectively.

7 Claims, 2 Drawing Sheets

METHOD FOR MODIFYING A MULTICAST TREE IN A SWITCHING NETWORK

TECHNICAL FIELD

The present invention relates to, in a switching network with a plurality of network inlets and network outlets and a plurality of interconnected switching nodes having node inputs and node outputs with respective addresses, a method of modifying a first set of said network outlets to which a cell stream is routed from one of said network inlets to a second set of said network outlets to which said cell stream is to be routed, the addresses of the node outputs of each of said switching nodes from which said cell stream is output, being stored in a routing table of said node.

BACKGROUND OF THE INVENTION

Such a method is already known in the art, e.g. from the article 'An ATM switching architecture with intrinsic multicast capabilities for the Belgian broadband experiment', by M. De Prycker et.al., Proceedings ISS 1990, Stockholm, May 1990, Vol V, pp. 111 to 118. Therein, the switching network is part of a local exchange via which connections may be made between e.g. an audio/TV distribution centre and subscriber stations. The switching nodes are referred to as switching elements and operate according to the Asynchronous Transfer Mode (ATM) protocol. The cell stream routed from the above one network inlet to the first set of network outlets, i.e. to each network outlet of this first set, is thus routed along a cluster of branches each leading via various ones of the above switching elements, such a cluster being referred to as a multicast tree in the above article and hereinafter. The modification of the first set of network outlets consists in the addition of network outlets to obtain the second set, i.e. in the addition of branches to the existing multicast tree. Thereto, the latter switching network being a so-called connection oriented switching network, so-called set-up cells are launched along this tree using the branches thereof as far as possible. Once the set-up cell can no longer use such branches in a switching node and therefore has to leave the multicast tree, the required resources are allocated in this switching node and a new branch is added to the existing multicast tree, thereby modifying the first set into a second set.

However, in a so-called connectionless switching network the latter way of modifying a multicast tree may not be applied since no connection is set up therein with a set-up cell but cells are routed therein to their respective destination which is indicated by a routing tag. In that case, a central controller may be provided which controls all switching nodes routing cells of the cell stream to their respective destination, the addition of a network outlet thus requiring extensive processing in this central controller. Indeed, this central controller must control all the latter routing switching nodes and must communicate thereto the information necessary for modifying the multicast tree.

SUMMARY OF THE INVENTION

An object of the present invention is to provide a method of the above known type wherein the modification of the first set of network outlets requires only a reduced amount of processing.

A further object of the present invention is to provide a method of the above known type but which is also applicable to so-called connectionless switching networks.

According to the invention, this object is achieved due to the fact that said method includes the steps of:
  transmitting a modification request message to said network inlets from each network outlet belonging to one but not to both of said sets;
  in each switching node receiving said modification request message on one of its node outputs, selectively transmitting said request message to said network inlets or transmitting a confirmation message to said each network outlet depending on the absence or presence in said node routing table of addresses of node outputs other than said one node output, respectively.

In this way, a network outlet is easily added to or deleted from the first set because the modification request message is broadcast towards the network inlets until it reaches a branch of the above mentioned multicast tree which at least leads to another network outlet of the first set than the one to be added or deleted, i.e. until it reaches a switching node via which the cell stream is at least routed to such other network outlet. Indeed, when the routing table of the switching node encountered by the modification request message includes no addresses of node outputs other than the node output on which the message was received, then the cell stream is not routed to such another network outlet via this switching node. On the other hand, when this routing table does include the address of a node output other than the node output on which the message was received, then the cell stream is routed to such other network outlet via this switching node so that the modification may be completed as indicated by the confirmation message.

Thus, when the modification request message reaches a switching node, it only has to be checked whether the routing table thereof contains addresses of node outputs other than the node output on which the message was received, such checking requiring only a reduced amount of processing, which furthermore is not done centrally but decentralized, i.e. by the switching nodes.

From the above it is clear that the method is also applicable to a connectionless switching network since it makes no use of a set-up cell for modifying the multicast tree. Furthermore, the method may also be applied for setting up a multicast tree, viz. when the modification request message reaches no branch of an already existing multicast tree, or for deleting an existing multicast tree, viz. when all outputs are deleted from the first set thereby obtaining an empty second set.

A further feature of the present invention is that said switching network constitutes a routing part of a switching network arrangement and is preceded by a distribution part thereof.

In such a switching network arrangement, the distribution part takes care of evenly distributing the load constituted by the cell stream in the arrangement, whereas the routing part takes care of routing the cells of the cell stream to the network outlets. The switching node from which the confirmation message is transmitted then obviously belongs to the routing part since from each switching node in the distribution part, and thus a fortiori from each switching node on the edge between the distribution and routing parts, i.e. from each network inlet of the routing part, each network outlet of the routing part may be reached.

Yet another feature of the present invention is that said modification request message requests for adding a network outlet to said first set of network outlets, is broadcast to said network inlets from said added network outlet, and is further, by a switching node receiving it, broadcast to said network inlets when its routing table includes no node output addresses.

In this way, a network outlet is added to the first set of network outlets, thereby obtaining the second set. It should be noted that in this case the address of the receipt node output is evidently not included in the above routing table, since the addition request message is only forwarded until the existing multicast tree is found whereafter the modification is completed, and since, before this multicast tree is found, the addition request message only encounters switching nodes through which the cell stream is not yet routed.

Another characteristic feature of the present invention is that, upon transmitting said confirmation message, each said switching node receiving said request message further transmits a control message to control means included in said switching network, said control means thereupon transmitting cease messages to said switching nodes for ceasing said broadcasting of said modification request message.

In this way, once the addition is completed, the addition request message is also ceased from being broadcast from other switching nodes, thus fully finishing the impact of the modification on the switching network and minimizing the load therein.

Still another feature of the present invention is that said modification request message requests for deleting a network outlet from said first set of network outlets, and is routed from said deleted network outlet to said network inlets via a path set up from said one network inlet to said deleted network outlet and via which said cell stream is routed, until it is received by a switching node whose routing table includes at least two node output addresses.

Thus, a network outlet is deleted from the first set, thereby obtaining the second set. In this case the deletion request message must only be forwarded via the still existing and to be deleted branch of the multicast tree until a switching node is met where the multicast tree splits in several branches. The address of the receipt node output is then evidently always included in the above routing table.

An even further characteristic feature of the present invention is that each of said network outlets of said first set of network outlets is chosen from a respective group of network outlets, and that said modification of said first set of network outlets consists in modifying all said groups, each network outlet of said second set of network outlets thus being chosen amongst a respective one of said modified groups of network outlets.

Thus, the cells of the cell stream are each routed via one of a number of different multicast trees each consisting of a cluster of branches between the one network inlet and the network outlets of the first set of network outlets, thus sharing the load imposed by the cell stream on the switching network over this switching network and reducing cell loss probability. In this case, in order to modify the first set of network outlets, a plurality of modification request messages equal to the plurality of multicast trees must be transmitted.

In a further embodiment of the present invention, said set of network outlets has a set address which is also stored in said table of said switching nodes through which said cell stream is routed.

In this way, various multicast trees can be set up simultaneously in the switching network, i.e. various clusters of paths between one of the network inlets and a set of the network outlets as the above first set may exist simultaneously within the switching network. Each such multicast tree or cluster of paths is then identified by the set address, and only the node output addresses included in the routing table which relate to the respective multicast tree, i.e. with the respective set address, are to be checked in order to determine whether the modification request message must be transmitted further to the network inlets, or not.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
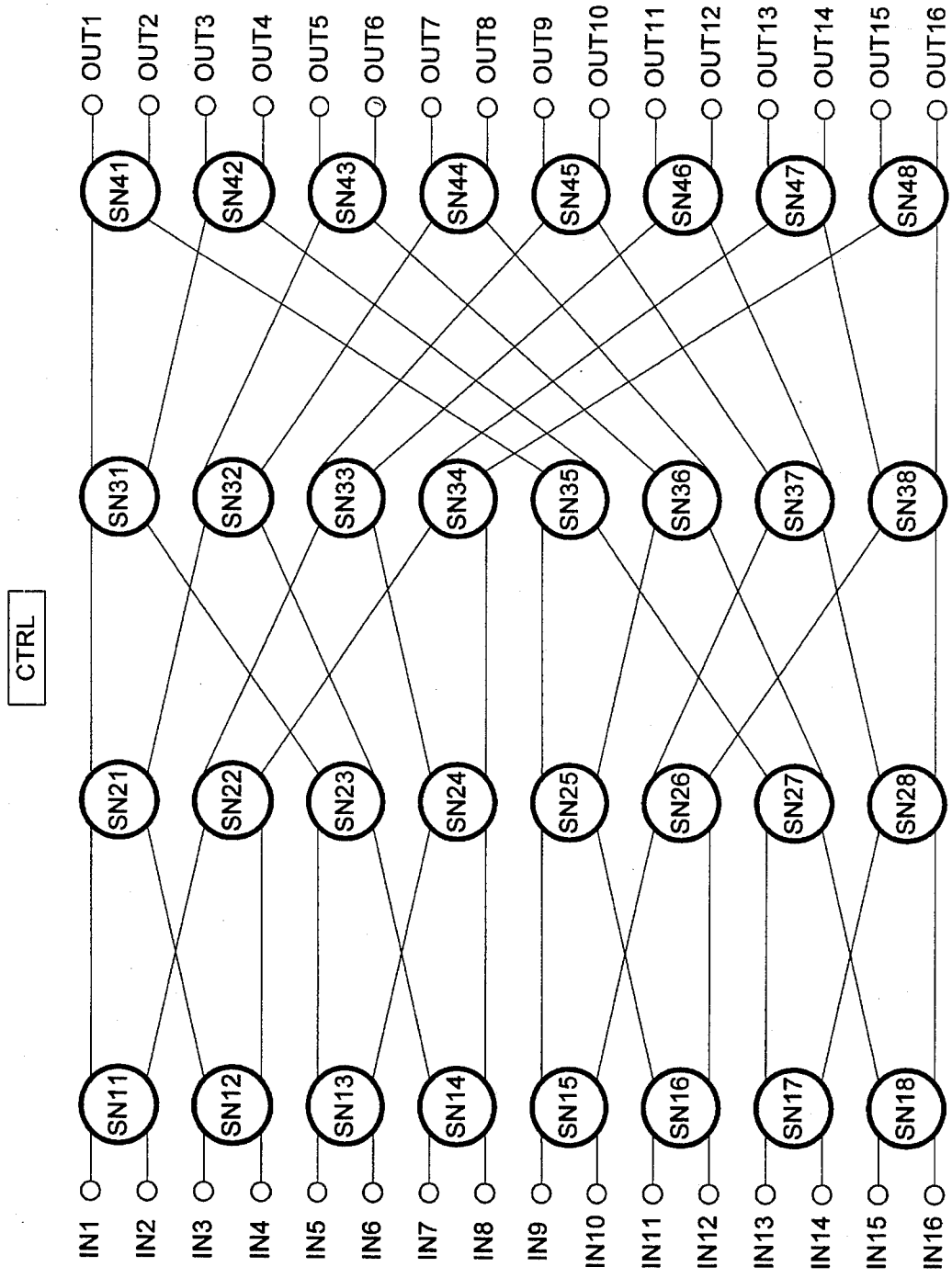
FIG. 1 shows a routing part of a switching network arrangement in which a method according to the invention for modifying a multicast tree is applied.

The routing part of the switching network arrangement shown in FIG. 1 is preceded by a distribution part which is built in a similar way as the routing part. This routing part includes four stages of 8 switching nodes each, a first stage with switching nodes SN11 to SN18, a second stage with switching nodes SN21 to SN28, a third stage with switching nodes SN31 to SN38, and a fourth stage with switching nodes SN41 to SN48, the switching nodes being interconnected as shown in FIG. 1. The routing part has 16 network inlets IN1 to IN16 and 16 network outlets OUT1 to OUT16. The fourth stage of the distribution part is connected to the first stage of the routing part, the switching network arrangement thus including 8 stages with 8 switching nodes each. It should be noted however that the four stages shown in FIG. 1 may be simultaneously used as distribution part and as routing part of the switching network arrangement when its switching nodes are bidirectional. Indeed, in that case the inlets IN1 to IN16 constitute inlets of the distribution part and outlets of the routing part, whereas the outlets OUT1 to OUT16 constitute a reflection plane on which cells are reflected back into the switching network arrangement. The cells are then distributed when being transmitted from the inlets of the distribution part to the reflection plane and are routed when being transmitted from this routing plane back to the outlets of the routing part.

The arrangement further includes a control means CTRL. It should be noted that the arrangement is preceded and followed by so-called termination link boards (not shown) interfacing between the arrangement and subscribers thereof.

Figure 2:
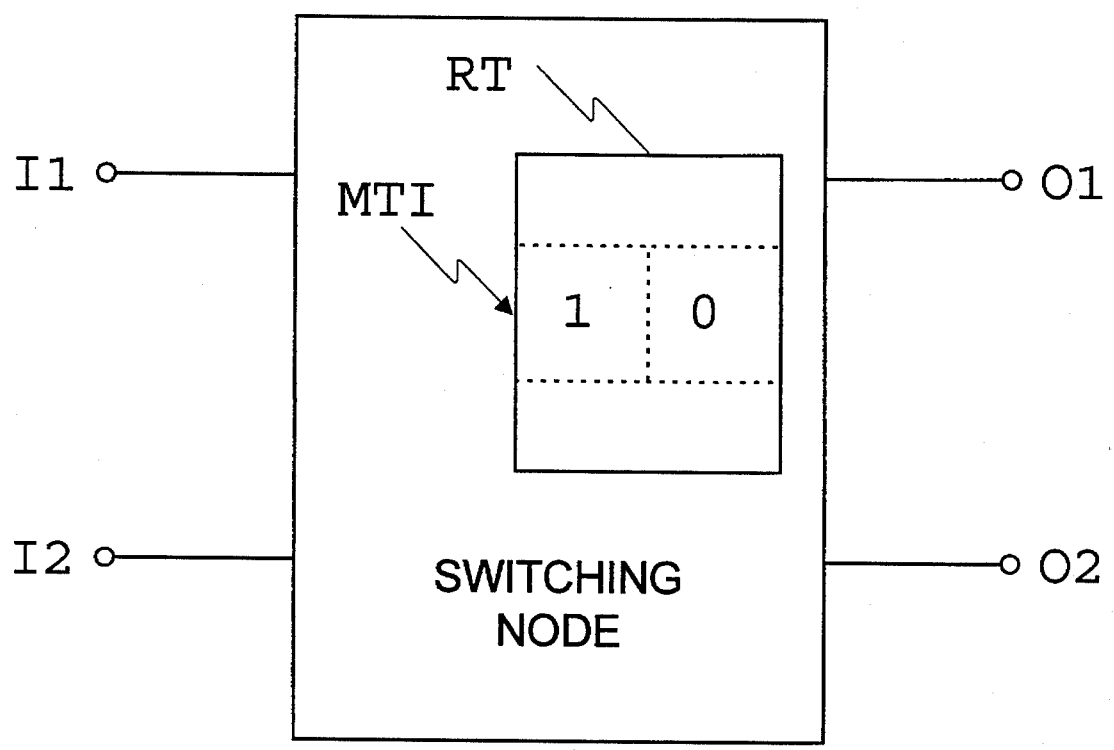
FIG. 2 represents a switching node used in the arrangement of FIG. 1.

Each of the switching nodes SN11 to SN48 has two node inputs I1 and I2 and two node outputs O1 and O2, as shown in FIG. 2, and includes a routing table RT for relating multicast tree or set addresses MTI to node outputs of the respective switching node, i.e. each entry of the routing table has an address MTI and includes two bits, one for each of the node outputs O1 and O2, which when set to 1 indicate that a copy of the cell stream identified by the respective address MTI is to be forwarded on the corresponding node output. Thus for the example given in FIG. 2, the cell stream with address MTI and arriving on node input I1 or I2 is forwarded on node output O1 but not on node output O2.

Such a switching network arrangement and switching nodes are known in the art and described for instance in the article 'Multicast handling in a self-routing switch architecture', by K. J. Schrodi e.a., Proceedings ISS92, October 1992, pp. 156 to 160. As described therein, multicast connections routing a cell stream from a network inlet of the switching network arrangement to a plurality of network outlets thereof, are required by a variety of services in the Broadband Integrated Services Digital Network (BISDN), e.g. video conferencing, video retrieval for pay television, virtual private networks. Another important application is the video on demand service. For each of these services a multicast tree need not only be set up in the switching network arrangement, but must also be easily adaptable. Indeed, for instance for a video on demand service, it should be possible to provide an additional subscriber with a video signal which is already being supplied to a plurality of other subscribers, i.e. connecting this additional subscriber to an already existing multicast tree should be able to be easily performed. Similarly, a subscriber should also be able to be easily disconnected from an existing multicast tree.

A method according to the invention is now described for modifying an existing multicast tree, i.e. for adding or deleting a subscriber from a group of subscribers serviced via this multicast tree. This method may also be applied for establishing a new multicast tree and for deleting an existing multicast tree.

First it is assumed that a multicast tree with address MT1 is set up in the switching network arrangement, for instance in the way described in the above referenced article by Schrodi. This multicast tree is set up from the network inlets IN5 to network outlets OUT1, OUT2, OUT4, OUT8 and OUT14, i.e. cells of a cell stream, which is assumed to be identified by the multicast tree address MT1 and these cells being distributed over the switching network arrangement in the (not shown) distribution stage thereof, are applied to the network inlets IN1 to IN16 and are from there routed to each of the latter network outlets. To that end, for e.g. cells of the latter cell stream which are applied to inlet IN5, the routing table of SN13 includes a 1 in both locations corresponding to address MT1, whereby two copies are made of each cell, one of which is output on node output O1 of SN13, and the other of which is output on node output O2 of SN13. Similarly, two copies of each cell are made in switching node SN23, in switching node SN31 and in switching node SN41, each node output of these switching nodes forwarding one of the two copies. For each of the switching nodes through which the multicast tree is set up, the bits of the entry of the routing table with address MT1 are set to 1 when a copy of the cells of the cell stream is to be forwarded on the corresponding node output, and to 0 otherwise, whereas the routing tables of the other switching nodes have no entry with address MT1.

When the cell stream MT1 must also be provided on for instance network outlet OUT9, then an addition request message is transmitted from the termination link board to the switching node SN45. Such an addition request message has the following form:

| REA | MTI | OUT |
|-----|-----|-----|

Herein,

REA is an identifier indicating that the message is an addition request message;

MTI is an address field including the address of the multicast tree to which the node output indicated in the node output field OUT is to be connected, i.e. the field MTI includes the address of the cell stream which should be routed to this node output;

OUT is the above node output field.

Hence, the addition request message transmitted to SN45 has the following form:

| REA | MTI | OUT9 |
|-----|-----|------|

As the multicast tree with address MT1 is not yet routed through SN45, which is indicated by the fact that both entries for the address MT1 in the routing table of SN45 are 0, this addition request message is broadcast from network outlet OUT9 to the network inlets, i.e. it is transmitted by switching node SN45, to which network outlet OUT9 is connected, to both switching nodes SN33 and SN37. The routing tables of both these switching nodes are then checked, whereupon in both cases it is again found that the cell stream MT1 is not yet routed through either of these switching nodes. Therefore, the addition request message is further broadcast to the network inlets, i.e. to switching nodes SN22 and SN24 by SN33, and to switching nodes SN26 and SN28 by SN37.

Then, checking of the routing table of switching node SN22, as well as that of SN24, SN26 and SN28, leads to the conclusion that they already include an entry for address MT1 which indicates that the cell stream MT1 is already transmitted on one of their respective node outputs. Since the addition request message is e.g. received on node output O1 of switching node SN24, the entry for address MT1 of the routing table of SN24 is adapted so that it now includes a 1 for both node outputs of SN24. The routing tables of SN22, SN26 and SN28 are similarly adapted.

Furthermore, SN24 sends a control message to the control means CTRL indicating that a connection to the multicast tree with address MT1 has been made, and that hence further broadcast of the corresponding addition request message by other switching nodes may be ceased. This control message evidently must include the multicast tree address MT1. The control means CTRL thereupon transmits cease messages to all the switching nodes of the switching network arrangement indicating that further transmission of the corresponding addition request message may be ceased. Each such cease message evidently must include the multicast tree address MT1. It should be noted that in the here described embodiment transmission of the cease messages may be limited to the switching nodes of the same stage as the switching node from which the above control message originates, i.e. the present case to switching nodes SN21 to SN28, and that one may even limit this transmission to switching nodes SN26 and SN28, as it may be easily verified that, except SN24, only these switching nodes of the second stage are involved in a broadcast originating from the network outlet OUT9 and directed to the network inlets. It is clear that the latter case the control message must also include the address of this network outlet, i.e. OUT9.

It should be noted that since the addition request messages reach the existing multicast tree in a same the above transmission of the control message to CTRL and the transmission of cease messages by CTRL thereupon is not necessary, i.e. CTRL may be omitted.

The switching nodes SN22, SN24, SN26 and SN28 then also transmit a confirmation message to the network outlet OUT9 which is routed along the path followed by the corresponding addition request message from OUT9 to SN24. This confirmation message has the following form:

| CNA | MTI | OUT |
|-----|-----|-----|

Herein,

CNA is an identifier indicating that the message is a confirmation message confirming an addition of a network outlet to a multicast tree;

MTI is an address field including the address of the multicast tree to which the node output indicated in the node output field OUT is connected, i.e. the field MTI includes the address of the cell stream which will now be routed to this node output;

OUT is the above node output field.

Hence, the confirmation messages transmitted to OUT9 have the following form:

| CNA | MT1 | OUT9 |

When this confirmation message reaches the network outlet OUT9 the multicast tree is modified and each cell of the cell stream MT1 is now also routed to network outlet OUT9.

Thus, a simple and effective way of adding branches to a multicast tree is provided, requiring only a minimal amount of processing.

Similarly, when the cell stream routed through the multicast tree with address MT1 should no longer be supplied to e.g. network outlet OUT8, then a deletion request message is transmitted from the termination link board to the switching node SN44. Such a deletion request message has the following form:

| RED | MTI | OUT |

Herein,

RED is an identifier indicating that the message is a deletion request message;

MTI is an address field including the address of the multicast tree from which the node output indicated in the node output field OUT is to be disconnected, i.e. the field MTI includes the address of the cell stream which should no longer be routed to this node output;

OUT is the above node output field.

Hence, the deletion request message transmitted to SN44 has the following form:

| RED | MT1 | OUT8 |

This deletion request message is transmitted from network outlet OUT8 to the network inlets via the branches of the multicast tree with address MT1 which are connected to OUT8, i.e. it is transmitted by switching node SN44, to which network outlet OUT8 is connected, to switching nodes SN32 and SN36. The routing table of these switching nodes are then checked, whereupon it is found that the cell stream MT1 is only transmitted by SN32 and SN36 to SN44 but not to another switching node. Therefore, the deletion request message is further transmitted by SN32 and SN36 via the branches of the multicast tree to the network inlets, i.e. to switching nodes SN21, SN23, SN25 and SN27.

Then, the routing tables of these switching nodes SN21, SN23, SN25 and SN27 are checked, which leads to the conclusion that they transmit the cell stream MT1 not only to switching node SN32 or SN36, respectively, but also to another switching node. Therefore, the entry for address MT1 of the routing tables of SN21, SN23, SN25 and SN27 is adapted so that they now include a 1 for the corresponding node outputs connected to SN32 and SN36.

The switching node SN23 then also transmits a confirmation message to the network outlet OUT8 which is routed along the branch of the original multicast tree leading to OUT8. This confirmation message has the following form:

| CND | MTI | OUT |

Herein,

CND is an identifier indicating that the message is a confirmation message confirming a deletion of a network outlet from a multicast tree;

MTI is an address field including the address of the multicast tree from which the node output indicated in the node output field OUT is disconnected, i.e. the field MTI includes the address of the cell stream which may no longer be routed to this node output;

OUT is the above node output field.

Hence, the confirmation message transmitted to OUT8 has the following form:

| CND | MT1 | OUT8 |

When this confirmation message reaches the network outlet OUT8 the multicast tree is modified and the cells of the cell stream MT1 are now no longer routed to this network outlet OUT8.

Thus, a simple and effective way of deleting branches from a multicast tree is provided, requiring only a minimal amount of processing.

It should be noted that a distinction may be made between a multicast tree identifier MTI identifying the multicast tree and a multicast connection identifier MCI identifying the connection, i.e. the cell stream routed through the multicast tree. In this way, different cell streams identified by different multicast connection identifiers MCI can be routed through the same multicast tree identified by one multicast tree identifier MTI. In that case it is clear that mutatis mutandis the above description still holds when requesting modifications of a multicast connection instead of a multicast tree.

It should be noted that the above described method also holds for multicast trees in a so-called connection oriented switching network arrangement where different cells of a cell stream follow the same path from a network inlet to a network outlet or network outlets. In that case, in order to limit the load on the network when adding a branch to an existing multicast tree, cease messages must be sent for ceasing further broadcast of modification request messages once the addition has been established.

While the principles of the invention have been described above in connection with specific apparatus, it is to be clearly understood that this description is made only by way of example and not as a limitation on the scope of the invention.

What is claimed is:

1. In a switching network with a plurality of network inlets and network outlets and a plurality of interconnected switching nodes having node inputs and node outputs with respective addresses, a method of modifying a first set of said network outlets to which a cell stream is routed from one of said network inlets to a second set of said network outlets to which said cell stream is to be routed, the addresses of the node outputs of each of said switching nodes from which said cell stream is output, being stored in a routing table of said each node, characterized in that said method includes the steps of:

transmitting a modification request message to said network inlets from each network outlet belonging to one but not to both of said sets;

in each switching node receiving said modification request message on one of the node outputs of said each switching node, selectively transmitting said request message to said network inlets or transmitting a confirmation message to said each network outlet depending on the absence or presence in said node routing table of addresses of node outputs other than said one node output, respectively.

2. A method according to claim 1, characterized in that said switching network constitutes a routing part of a switching network arrangement and is preceded by a distribution part thereof.

3. A method according to claim 1, characterized in that said modification request message requests for adding a network outlet to said first set of network outlets, is broadcast to said network inlets from said added network outlet, and is further, by a switching node receiving it, broadcast to said network inlets when the routing table of said network inlets includes no node output addresses.

4. A method according to claim 1, characterized in that, upon transmitting said confirmation message, each said switching node receiving said request message further transmits a control message to control means included in said switching network, said control means thereupon transmitting .cease messages to said switching nodes for ceasing said transmitting of said modification request message.

5. A method according to claim 1, characterized in that said modification request message requests for deleting a network outlet from said first set of network outlets, and is routed from said deleted network outlet to said network inlets via a path set up from said one network inlet to said deleted network outlet and via which said cell stream is routed, until said cell stream is received by a switching node whose routing table includes at least two node output addresses.

6. A method according to claim 1, characterized in that each of said network outlets of said first set of network outlets is chosen from a respective group of network outlets, and that said modification of said first set of network outlets consists in modifying all said groups, each network outlet of said second set of network outlets thus being chosen amongst a respective one of said modified groups of network outlets.

7. A method according to claim 1, characterized in that said set of network outlets has a set address which is also stored in said table of said switching nodes through which said cell stream is routed.

* * * * *